United States Patent
Lai et al.

(10) Patent No.: US 10,318,428 B2
(45) Date of Patent: Jun. 11, 2019

(54) POWER AWARE HASH FUNCTION FOR CACHE MEMORY MAPPING

(71) Applicant: Microsoft Technology Licensing, LLC, Redmond, WA (US)

(72) Inventors: Patrick P. Lai, Fremont, CA (US); Robert Allen Shearer, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 32 days.

(21) Appl. No.: 15/262,619

(22) Filed: Sep. 12, 2016

(65) Prior Publication Data
US 2018/0074964 A1 Mar. 15, 2018

(51) Int. Cl.
*G06F 12/00* (2006.01)
*G06F 12/0864* (2016.01)
(Continued)

(52) U.S. Cl.
CPC ...... *G06F 12/0864* (2013.01); *G06F 12/0813* (2013.01); *G06F 12/0842* (2013.01);
(Continued)

(58) Field of Classification Search
CPC ........... G06F 12/084; G06F 2212/2542; G06F 2212/271; G06F 12/0813; G06F 12/0864;
(Continued)

(56) References Cited

U.S. PATENT DOCUMENTS

| 6,092,153 A | 7/2000 | Lass |
| 7,240,160 B1 | 7/2007 | Hetherington et al. |

(Continued)

FOREIGN PATENT DOCUMENTS

| EP | 2843561 A1 | 3/2015 |
| JP | H1074167 A | 3/1998 |
| WO | 2013105931 A1 | 7/2013 |

OTHER PUBLICATIONS

Flautner, et al., "Drowsy Caches: Simple Techniques for Reducing Leakage Power", In Proceedings of the 29th Annual International Symposium on Computer Architecture, May 25, 2002, 10 pages.
(Continued)

*Primary Examiner* — Mardochee Chery
(74) *Attorney, Agent, or Firm* — Alleman Hall Creasman & Tuttle LLP

(57) ABSTRACT

A multi-core processing chip where the last-level cache functionality is implemented by multiple last-level caches (a.k.a. cache slices) that are physically and logically distributed. The hash function used by the processors on the chip is changed according to which of last-level caches are active (e.g., 'on') and which are in a lower power consumption mode (e.g., 'off'.) Thus, a first hash function is used to distribute accesses (i.e., reads and writes of data blocks) to all of the last-level caches when, for example, all of the last-level caches are 'on.' A second hash function is used to distribute accesses to the appropriate subset of the last-level caches when, for example, some of the last-level caches are 'off.' The chip controls the power consumption by turning on and off cache slices based on power states, and consequently dynamically switches among at least two hash functions.

20 Claims, 12 Drawing Sheets

(51) Int. Cl.
*G06F 12/0813* (2016.01)
*G06F 12/0842* (2016.01)

(52) U.S. Cl.
CPC ........ *G06F 2212/1016* (2013.01); *G06F 2212/1028* (2013.01); *G06F 2212/6042* (2013.01); *Y02D 10/13* (2018.01)

(58) Field of Classification Search
CPC ........ G06F 2212/1028; G06F 12/0806; G06F 12/0811; G06F 12/0897; G06F 1/3275; G06F 2212/1016; G06F 2212/1032; G06F 2212/6042; G06F 9/5094
USPC ........................................................ 711/120
See application file for complete search history.

(56) References Cited

U.S. PATENT DOCUMENTS

| | | |
|---|---|---|
| 7,647,452 B1 | 1/2010 | Moll et al. |
| 7,752,474 B2 | 7/2010 | Keller et al. |
| 7,958,312 B2 | 6/2011 | Moll et al. |
| 8,103,830 B2 | 1/2012 | Wilkerson et al. |
| 8,225,046 B2 | 7/2012 | Licht et al. |
| 8,225,315 B1 | 7/2012 | Cheng et al. |
| 8,533,395 B2 | 9/2013 | O'Connor et al. |
| 8,595,731 B2 | 11/2013 | Bose et al. |
| 8,731,773 B2 | 5/2014 | Yousefi et al. |
| 9,032,151 B2 | 5/2015 | Iyigun et al. |
| 9,128,842 B2 | 9/2015 | Moses et al. |
| 9,176,875 B2 | 11/2015 | Wang et al. |
| 9,360,924 B2 | 6/2016 | Gendler et al. |
| 2004/0117669 A1 | 6/2004 | Wilson |
| 2008/0010408 A1 | 1/2008 | Shen et al. |
| 2008/0162972 A1 | 7/2008 | Liu et al. |
| 2008/0307422 A1 | 12/2008 | Kurland et al. |
| 2009/0138220 A1 | 5/2009 | Bell et al. |
| 2010/0180089 A1 | 7/2010 | Flemming et al. |
| 2010/0228922 A1 | 9/2010 | Limaye |
| 2011/0219190 A1 | 9/2011 | Ng et al. |
| 2012/0054750 A1 | 3/2012 | Saripalli |
| 2012/0089853 A1 | 4/2012 | Henderson et al. |
| 2013/0007491 A1 | 1/2013 | Iyer et al. |
| 2014/0143577 A1 | 5/2014 | Nachimuthu et al. |
| 2014/0189284 A1 | 7/2014 | Hyuseinova et al. |
| 2014/0208018 A1 | 7/2014 | Benhase et al. |
| 2014/0254286 A1 | 9/2014 | Bronner et al. |
| 2014/0281311 A1 | 9/2014 | Walker et al. |
| 2014/0304475 A1 | 10/2014 | Ramanujan et al. |
| 2015/0039833 A1 | 2/2015 | Chang et al. |
| 2015/0089263 A1 | 3/2015 | Allen-Ware et al. |
| 2015/0309930 A1 | 10/2015 | Olorode et al. |
| 2016/0092363 A1 | 3/2016 | Wang et al. |
| 2016/0179680 A1 | 6/2016 | Shows et al. |
| 2016/0259721 A1 | 9/2016 | Walker et al. |
| 2016/0283374 A1* | 9/2016 | Pal .................. G06F 12/084 |
| 2018/0210836 A1 | 7/2018 | Lai et al. |

OTHER PUBLICATIONS

"Non Final Office Action Issued in U.S. Appl. No. 15/620,950", dated Jul. 13, 2018, 6 Pages.

Beigi, et al., "TAPAS: Temperature-Aware Adaptive Placement for 3D Stacked Hybrid Caches", In Proceedings of the Second International Symposium on Memory Systems, Oct. 3, 2016, 12 Pages.

Heo, et al., "Reducing Power Density through Activity Migration", In Proceedings of the International Symposium on Low Power Electronics And Design, Aug. 26, 2003, 28 Pages.

Knoth, Matthias, "Power Management in an Embedded Multiprocessor Cluster", In Proceedings of the Embedded World Conference, Nov. 21, 2009, 6 Pages.

"International Search Report and Written Opinion Issued in PCT Application No. PCT/US2018/013037", dated Mar. 15, 2018, 15 Pages.

Wang, et al., "Data Remapping for Static NUCA in Degradable Chip Multiprocessor", In IEEE Transactions on Very Large Scale Integration (VLSI) Systems, vol. 23, Issue 5, May 2015, 14 Pages.

Zhao, et al., "Towards Hybrid Last Level Caches for Chip-Multiprocessors", In Proceedings of ACM SIGARCH Computer Architecture News, vol. 36, Issue 2, May 2008, 8 Pages.

\* cited by examiner

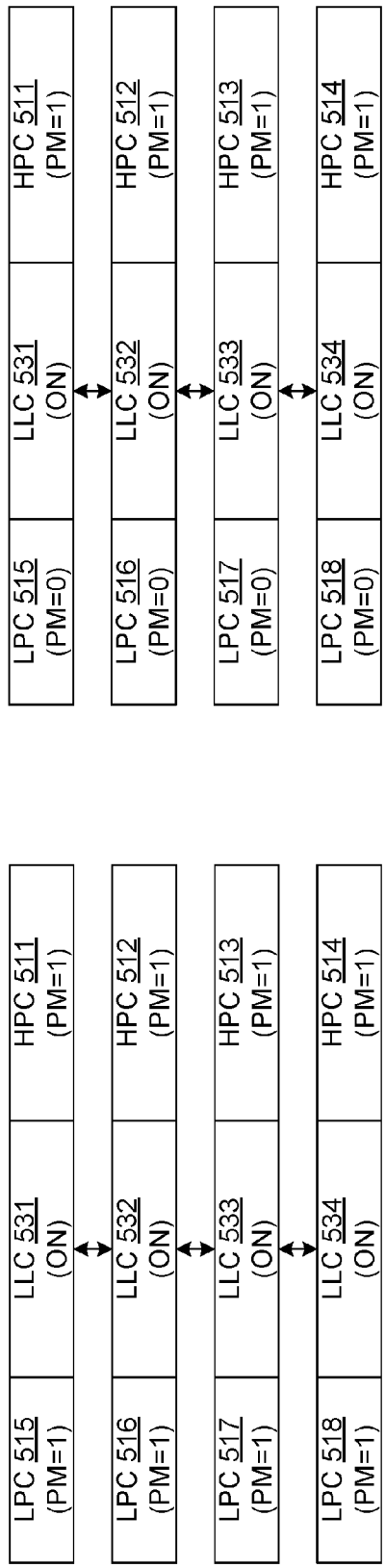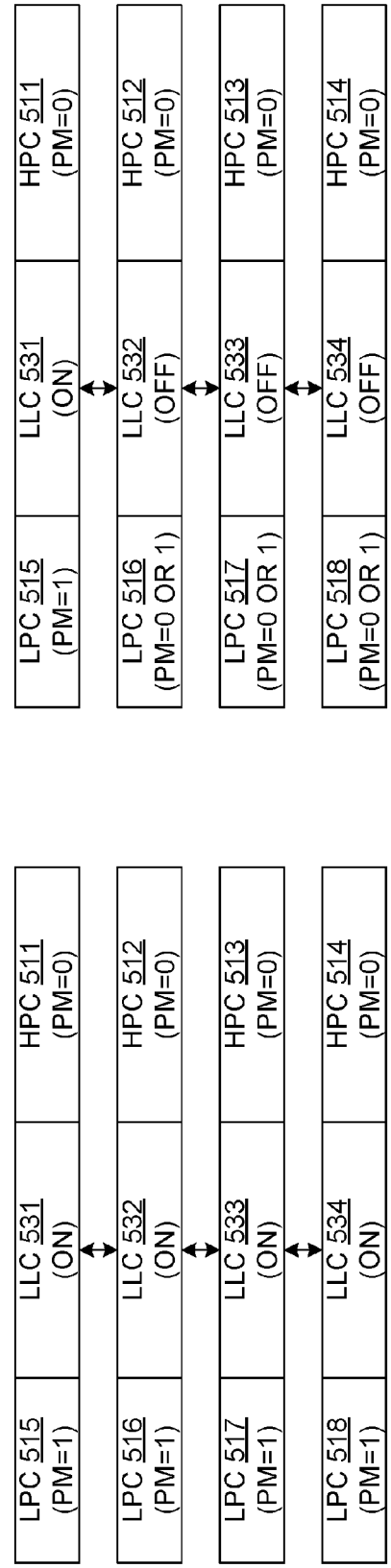
FIGURE 5A
FIGURE 5B
FIGURE 5C
FIGURE 5D

POWER AWARE HASH FUNCTION FOR CACHE MEMORY MAPPING

BACKGROUND

Integrated circuits, and systems-on-a-chip (SoC) may include multiple independent processing units (a.k.a., "cores") that read and execute instructions. These multi-core processing chips typically cooperate to implement multiprocessing. To facilitate this cooperation and to improve performance, multiple levels of cache memories may be used to help bridge the gap between the speed of these processors and main memory.

SUMMARY

Examples discussed herein relate to an integrated circuit that includes a plurality of last-level caches. These last-level caches can be placed in at least a high power consumption mode and a low power consumption mode. A plurality of processor cores access data in the plurality of last-level caches according to a first hashing function. Based at least in part on all of the last-level caches being in the first high power consumption mode, the processor cores use the first hashing function to map processor access addresses to respective ones of the plurality of last-level caches. Based at least in part on at least one of the last-level caches being in the low power consumption mode, the processor cores access data in the plurality of last-level caches according to a second hashing function that maps processor access addresses to a subset of the plurality of last-level caches. An interconnect network receives hashed access addresses from the plurality of processor cores and couples each of the plurality of processor cores to a respective one of the plurality of last-level caches specified by the hashed access addresses generated by a respective one of the first and second hashing function.

In an example, a method of operating a processing system having a plurality of processor cores includes, based at least in part on a first set of last-level caches of a plurality of last-level caches being in a first power-consumption mode, mapping accesses by a first processor core of the plurality of processor cores to the first set of last-level caches by using a first hashing function. The method also includes, based at least in part on a second set of last-level caches of the plurality of last-level caches being in the first power-consumption mode, mapping accesses by the first processor core to the second set of last-level caches by using a second hashing function.

In an example, a method of operating a plurality of processor cores on an integrated circuit includes distributing accesses by a first processor core to a first set of last-level caches of a plurality of last-level caches using a first hashing function. The first processor core being associated with a first last-level cache of the plurality of last-level caches. The method also includes distributing accesses by a second processor core to the first set of last-level caches using the first hashing function. The second processor core being associated with a second last-level cache of the plurality of last-level caches. The method also includes placing the second last-level cache in a first power-consumption mode and while the second last-level cache is in the first power-consumption mode, distributing accesses by the first processor core to a second set of last-level caches using a second hashing function that does not map accesses to the second last-level cache.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIGS. 5A-5D illustrate example power states for a heterogeneous multi-processor system that share respective last-level caches.

DETAILED DESCRIPTION OF THE EMBODIMENTS

Figure 1A:
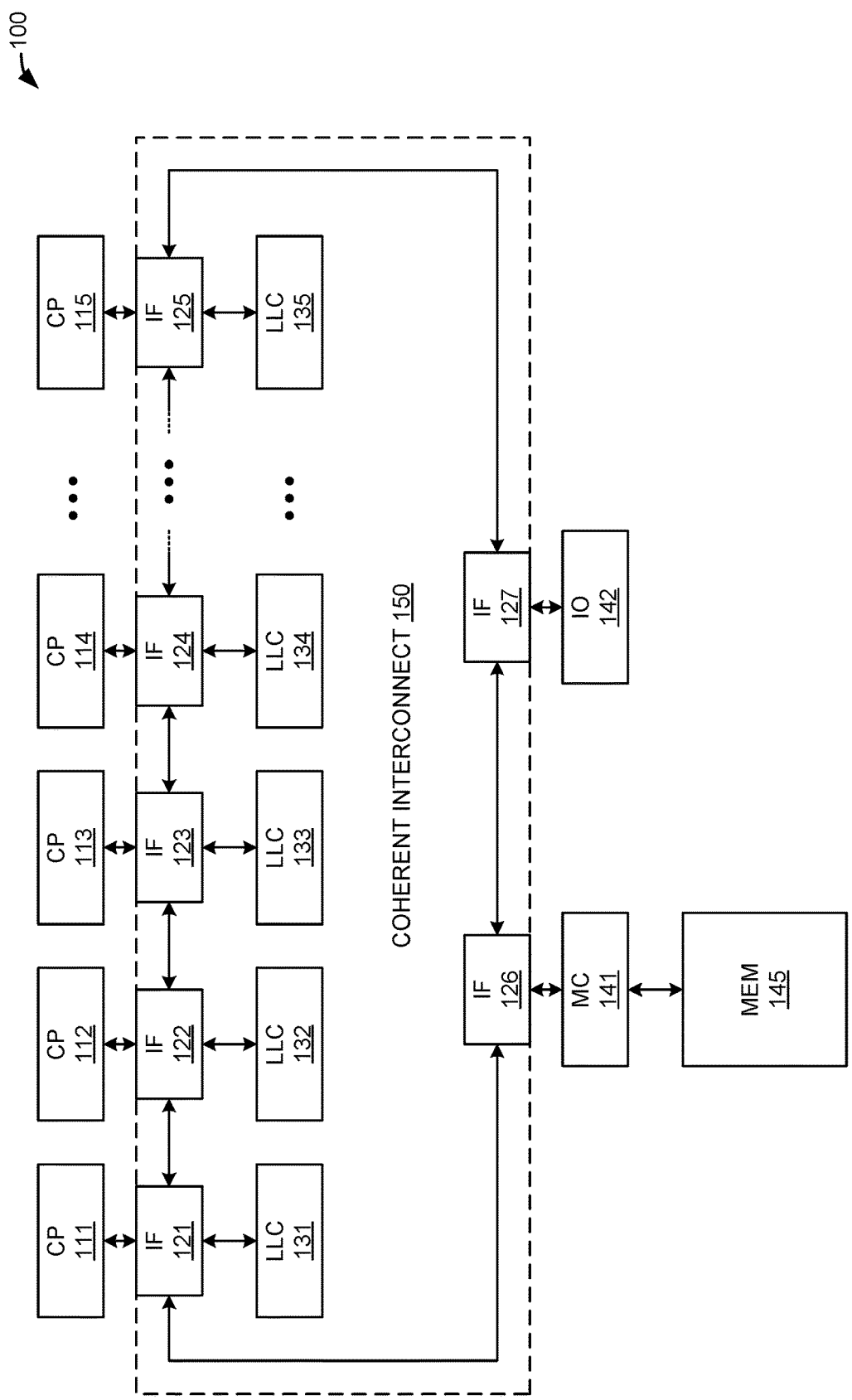
FIG. 1A is a block diagram illustrating a processing system.

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or an integrated circuit.

In a multi-core processing chip, the last-level cache may be implemented by multiple last-level caches (a.k.a. cache slices) that are physically and logically distributed. The various processors of the chip decide which last-level cache is to hold a given data block by applying a hash function to the physical address. In order to reduce power consumption, it is desirable to shut down (and eventually restart) one of more of the last-level caches.

In an embodiment, the hash function used by the processors on a chip to distribute accesses to the various last-level caches is changed according to which last-level caches are active (e.g., 'on') and which are in a lower power consumption mode (e.g., 'off'.) Thus, a first hash function is used to distribute accesses (i.e., reads and writes of data blocks) to all of the last-level caches when, for example, all of the last-level caches are 'on.' A second hash function is used to distribute accesses to the appropriate subset of the last-level caches when, for example, some of the last-level caches are 'off.' In this manner, data can be cached in only the active last-level caches while not attempting to cache data in the inactive last-level caches—which may result in an expensive (in power and time) 'write-through' to main memory.

As used herein, the term "processor" includes digital logic that executes operational instructions to perform a sequence of tasks. The instructions can be stored in firmware or software, and can represent anywhere from a very limited to a very general instruction set. A processor can be one of several "cores" (a.k.a., 'core processors') that are collocated on a common die or integrated circuit (IC) with other processors. In a multiple processor ("multi-processor") system, individual processors can be the same as or different than other processors, with potentially different performance characteristics (e.g., operating speed, heat dissipation, cache sizes, pin assignments, functional capabilities, and so forth). A set of "asymmetric" or "heterogeneous" processors refers to a set of two or more processors, where at least two processors in the set have different performance capabilities (or benchmark data). A set of "symmetric" or "homogeneous" processors refers to a set of two or more processors, where all of the processors in the set have the same performance capabilities (or benchmark data). As used in the claims below, and in the other parts of this disclosure, the terms "processor", "processor core", and "core processor", or simply "core" will generally be used interchangeably.

FIG. 1A is a block diagram illustrating a processing system. In FIG. 1, processing system 100 includes core processor (CP) 111, core processor 112, core processor 113, core processor 114, core processor 115, coherent interconnect 150, memory controller 141, input/output (IO) processor 142, and main memory 145. Coherent interconnect 150 includes interfaces 121-127 and last-level caches 131-135. Processing system 100 may include additional processors, interfaces, caches, and IO processors (not shown in FIG. 1.)

Core processor 111 is operatively coupled to interface 121 of interconnect 150. Interface 121 is operatively coupled to last-level cache 131. Core processor 112 is operatively coupled to interface 122 of interconnect 150. Interface 122 is operatively coupled to last-level cache 132. Core processor 113 is operatively coupled to interface 123 of interconnect 150. Interface 123 is operatively coupled to last-level cache 133. Core processor 114 is operatively coupled to interface 124 of interconnect 150. Interface 124 is operatively coupled to last-level cache 134. Core processor 115 is operatively coupled to interface 125 of interconnect 150. Interface 125 is operatively coupled to last-level cache 135. Memory controller 141 is operatively coupled to interface 126 of interconnect 150 and to main memory 145. IO processor 142 is operatively coupled to interface 127.

Interface 121 is also operatively coupled to interface 122. Interface 122 is operatively coupled to interface 123. Interface 123 is operatively coupled to interface 124. Interface 124 is operatively coupled to interface 125—either directly or via additional interfaces (not shown in FIG. 1.) Interface 125 is operatively coupled to interface 127. Interface 127 is operatively coupled to interface 126. Interface 126 is operatively coupled to interface 121. Thus, for the example embodiment illustrated in FIG. 1, it should be understood that interfaces 121-127 are arranged in a 'ring' interconnect topology. Other network topologies (e.g., mesh, crossbar, star, hybrid(s), etc.) may be employed by interconnect 150.

Interconnect 150 operatively couples processors 111-115, memory controller 141, and IO processor 142 to each other and to last-level caches 131-135. Thus, data access operations (e.g., load, stores) and cache operations (e.g., snoops, evictions, flushes, etc.), by a processor 111-115, last-level cache 131-135, memory controller 141, and/or IO processor 142 may be exchanged with each other via interconnect 150 (and interfaces 121-127, in particular.)

It should also be noted that for the example embodiment illustrated in FIG. 1, each one of last-level caches 131-135 is more tightly coupled to a respective processor 111-115 than the other processors 111-115. For example, for processor 111 to communicate a data access (e.g., cache line read/write) operation to last-level cache 131, the operation need only traverse interface 121 to reach last-level cache 131 from processor 111. In contrast, to communicate a data access by processor 111 to last-level cache 132, the operation needs to traverse (at least) interface 121 and interface 122. To communicate a data access by processor 111 to last-level cache 133, the operation needs to traverse (at least) interface 121, 122 and 123, and so on. In other words, each last-level cache 131-135 is associated with (or corresponds) to the respective processor 111-115 with the minimum number of intervening interfaces 121-127 (or hops) between that last-level cache 131-135 and the respective processor 111-115.

In an embodiment, each of processors 111-115 distributes data blocks (e.g., cache lines) to last-level caches 131-135 according to at least two cache hash functions. For example, a first cache hash function may be used to distribute data blocks being used by at least one processor 111-115 to all of last-level caches 131-135. In another example, one or more (or all) of processors 111-115 may use a second cache hash function to distribute data blocks to less than all of last-level caches 131-135.

Provided all of processors 111-115 (or at least all of processors 111-115 that are actively reading/writing data to memory) are using the same cache hash function at any given time, data read/written by a given processor 111-115 will be found in the same last-level cache 131-135 regardless of which processor 111-115 is accessing the data. In other words, the data for a given physical address accessed by any of processors 111-115 will be found cached in the same last-level cache 131-135 regardless of which processor is making the access. The last-level cache 131-135 that holds (or will hold) the data for a given physical address is determined by the current cache hash function being used by processors 111-115, memory controller 142, and IO processor 142. The current cache hash function being used by system 100 may be changed from time-to-time. The current cache hash function being used by system 100 may be changed from time-to-time in order to reduce power consumption by turning off (or placing in a lower power mode) one or more of last-level caches 131-135.

Figure 1B:
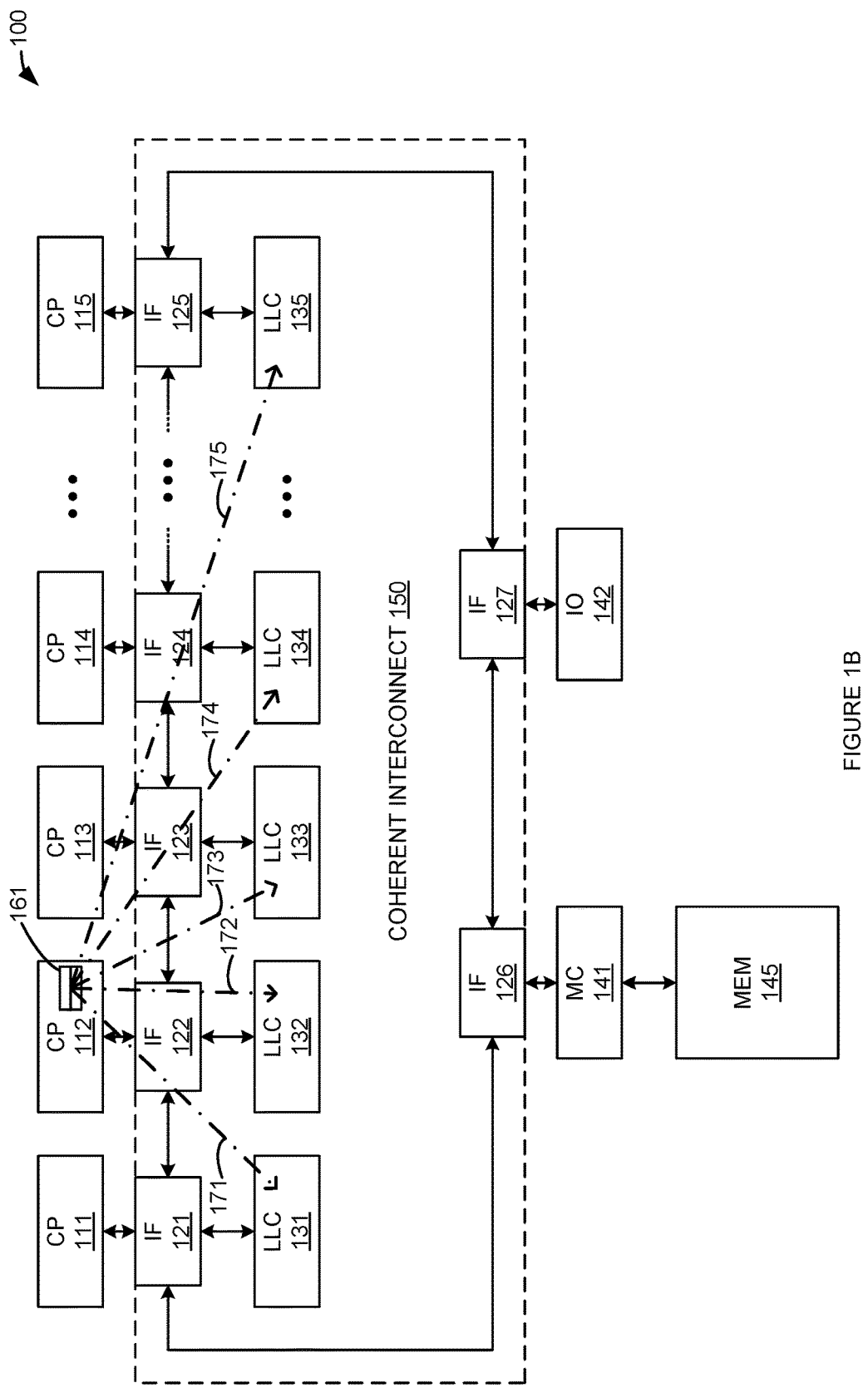
FIG. 1B is a diagram illustrating an example distribution of accesses to last-level caches by a first hashing function.

FIG. 1B is a diagram illustrating an example distribution of accesses to last-level caches by a first hashing function. In FIG. 1B, processor 112 uses a (first) cache hash function that distributes accessed data physical addresses 161 to all of last-level caches 131-135. This is illustrated by example in FIG. 1B by arrows 171-175 that run from accessed data physical addresses 161 in processor 112 to each of last-level caches 131-135, respectively.

Figure 1C:
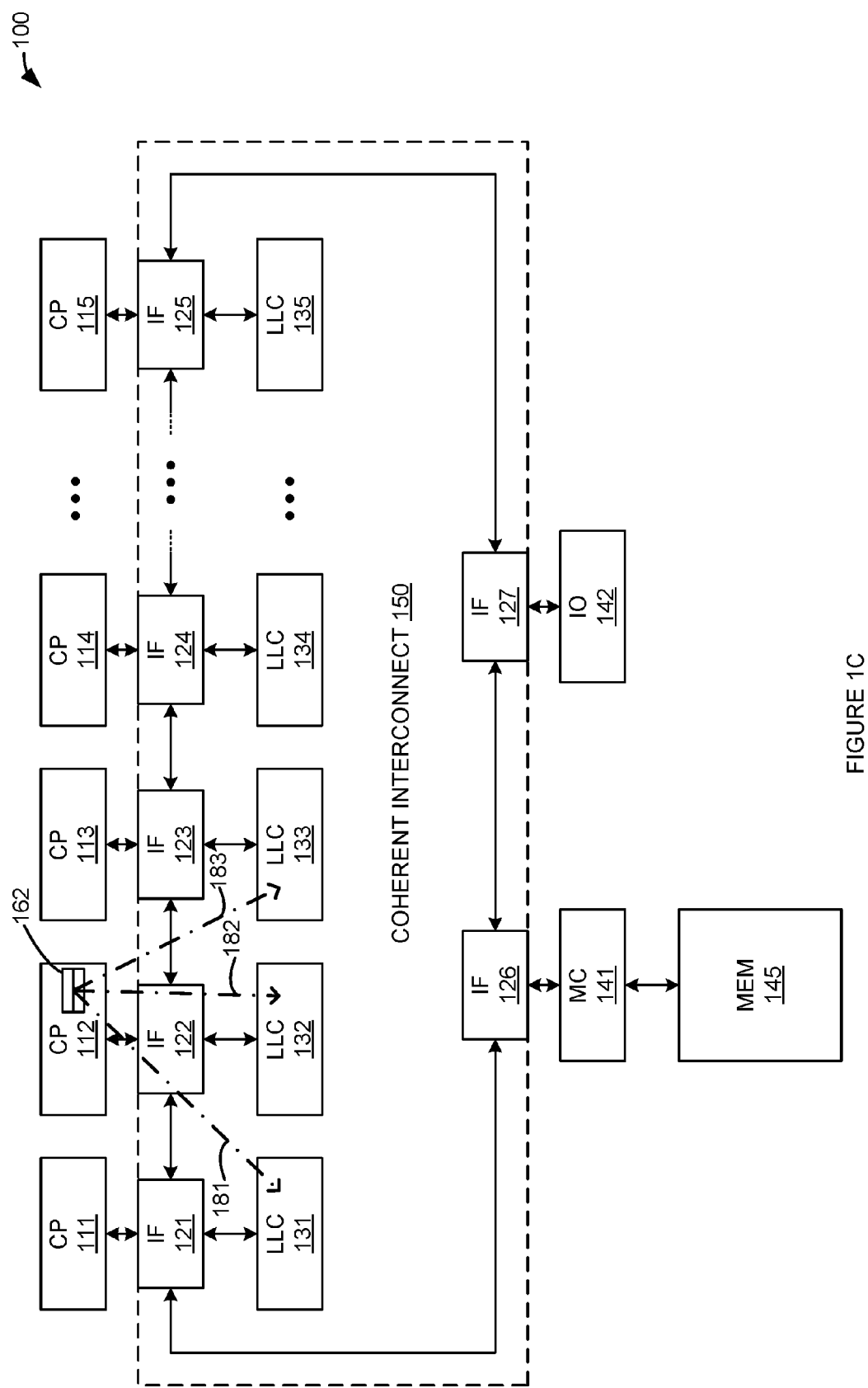
FIG. 1C is a diagram illustrating an example distribution of accesses to last-level caches by a second hashing function.

FIG. 1C is a diagram illustrating an example distribution of accesses to last-level caches by a second hashing function. In FIG. 1C, processor 112 uses a (second) cache hash function (different from the first cache hash function illustrated in FIG. 1B) that distributes accessed data physical addresses 162 to only last-level caches 131-133 (and not LLCs 134 and 135.) This is illustrated by example in FIG. 1C by arrows 181-183 that run from accessed data physical addresses 162 to each of last-level caches 131-133, respectively—and the lack of arrows from data 162 to last-level caches 134-135.

In an embodiment, each of last-level caches 131-135 may be placed in a high power consumption mode (e.g., normal operation) or a low power consumption mode (e.g., a standby, powered-down, or 'off' mode). Other power consumption modes are contemplated (e.g., standby with 'quick on', standby with 'slow on', etc.) Based at least in part on all of last-level caches 131-135 being in the high power mode (i.e., all of caches 131-135 are in normal operating mode) each of processor cores 111-115 accesses data residing in respective last-level caches 131-135 according to a first hash function that maps respective physical addresses to respective ones of a set of caches that includes all of last-level caches 131-135. Based at least in part on at least one of last-level caches 131-135 (e.g., last-level cache 135) being in a low power consumption mode (e.g., 'off'), each of processor cores 111-115 access data in last-level caches 131-135 according to a second hash function that maps respective physical addresses to respective ones of a set of caches that does not include the last-level cache(s) 131-135 that are in the low power mode (e.g., last-level cache 135). Interconnect 150 receives the hashed access addresses (i.e., hashed by a processor 111-115 according to either the first or second cache hash function) from processor cores 111-115 that specifies a last-level cache 131-135 and couples the data to/from that last-level cache 131-135 according to that hashed access address specified by the currently active cache hashing function.

Processor cores 111-115 may comprise low power type process cores and high power type processor cores. The type of core a respective processor 111-115 is may be determined by its design and/or other features. For example, processor cores 111-112 may be higher power consuming 64-bit cores and processor cores 113-114 may be lower power consuming 32-bit processor cores. The type of core a respective processor 111-115 is may be determined by configuring the respective processor to operate in a particular (e.g., high or low) power-consumption mode. For example, at a given point in time, processor cores 111-112 may be configured to be operating in a higher power consuming mode and processor cores 113-114 may be configured to be operating in a lower power consuming mode.

In an embodiment, based at least in part on one or more of last-level caches 131-135 being in a low power consumption mode (and are therefore not being accessed as a result of the current cache hashing function), the corresponding ones of processors 111-115 that are most tightly coupled to those last-level caches in the low power mode are also placed in a low power consuming mode. In other words, for example, if last-level caches 131-132 are placed in a low power consumption mode, corresponding processors 111-112 are also placed in a low power consumption mode. It should be understood, however, that since processors 111-115 comprise different circuits/systems, the low power consumption mode of processors 111-115 may be different, have different characteristics, or be accomplished in a different manner, than the low power consumption mode of last-level caches 131-135.

Processing system 100 may be operated such that base at least in part on different sets of last-level caches 131-135 being in different power consumptions modes, the cache hashing function used by processing system 100 (and processors 111-115, in particular) is also different. For example, when last-level caches 131, 133, and 135 are in a higher power consumption mode (e.g., normal operation mode) and the other last-level caches 132 and 134 are in a lower power consumption mode, each processor 111-115 that is active (e.g., processor 111) will use a cache hashing function that maps, based on physical addresses, each access to a one of last-level caches 131, 133, or 135, but does not map accesses to last-level cache 132 or 134. Based at least in part on a different set of last-level caches 131 and 134 being in the higher power consumption mode and the other last-level caches 132, 133, and 135 being in the lower power consumption mode, each processor 111-115 that is active (e.g., processor 111) uses a cache hashing function that maps, based on physical addresses, each access to a physical memory address to a one of last-level caches 131 or 134, but does not map accesses to last-level cache 132, 133, or 135.

To help with the performance of any given active processor, the processors 111-115 selected to be active may be selected from those processors that are most tightly coupled to the last-level caches that are in the higher power mode. In other words, if some processors 111-115 are to also be placed in lower power consumption modes based at least in part on some of last-level caches 131-135 being placed in a lower power consumption mode, the processors 111-115 selected to be placed in a low power mode may be selected from the group of processors 111-115 that are associated with the last-level caches that are operating in the lower power consumption mode. For example, if the set of last-level caches 131-135 remaining in the higher power mode consists of caches 132, 133, and 134, it may improve overall power efficiency and performance to select at least processors 112, 113, and 114 to operate in the higher power mode.

In an embodiment, the last-level caches 131-135 selected to be placed in a lower power (or higher power) mode (and thereby not be selected by the current hash function) may be selected based on the type of processor (e.g., low-performance low power vs. high-performance high power) most tightly coupled with a respective processor 111-115. For example, processing system 100 may elect to run in a mode whereby only low-performance low power cores (e.g., processors 111-112) are active, and the remaining high power cores (e.g., processors 113-115) are inactive. In this case, the current cache hash function may be configured/selected such that only last-level caches 131-132 are going to be accessed.

In an embodiment, a first processing core (e.g., processing core 111) may distribute, according to a first hash function, accesses to a set of last-level caches 131-135 that includes the last-level cache most tightly coupled to the first processing core (i.e., last-level cache 131.) A second processing core (e.g., processing core 112) may also distribute, according to the first hash function, accesses to a set of last-level caches 131-135 that includes the last-level cache most tightly coupled to the second processing core (i.e., last-level cache 132.) The last-level cache most tightly coupled to the second processing core (i.e., last-level cache 132) may then be placed in a low power consumption mode. While the last-level cache most tightly coupled to the second processing core is in the low power consumption mode, the first processing core (e.g., processing core 111) may distribute, accesses according to a second hash function that does not map access to the last-level cache most tightly coupled to the second processing core (i.e., last-level cache 132.)

A third processing core (e.g., processing core 133) may also distribute, according to the first hash function, accesses to a set of last-level caches 131-135 that includes the last-level cache most tightly coupled to the third processing core (i.e., last-level cache 133.) The last-level cache most tightly coupled to the third processing core (i.e., last-level cache 133) may then be placed in a low power consumption mode. While the last-level cache most tightly coupled to the third processing core is in the low power consumption mode, the first processing core (e.g., processing core 111) may distribute, according to a third hash function that does not map accesses to the last-level cache most tightly coupled to the second processing core (i.e., last-level cache 132) or the last-level cache most tightly coupled to the third processing core (i.e., last-level cache 133.) The selection of active processing cores 111-115 and/or caches 131-135 may be based on the type (e.g., low-performance/high-performance) or mode (low power/high power) of the processing core 111-115 and/or cache 131-135.

Figure 2A:
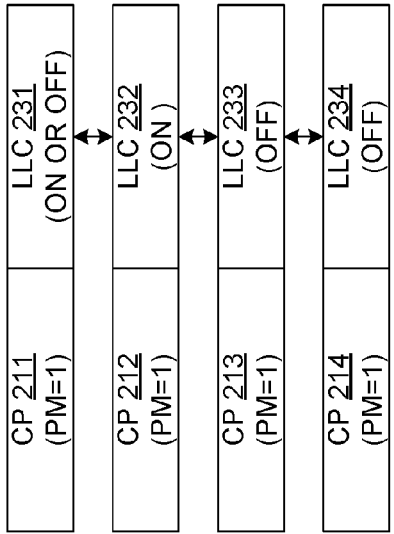
FIGS. 2A-2C illustrate example power states for a homogeneous set of multiple processors and multiple last-level caches.
Figure 2B:
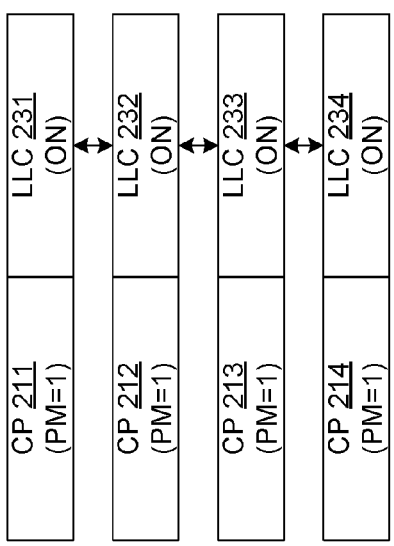
Figure 2C:
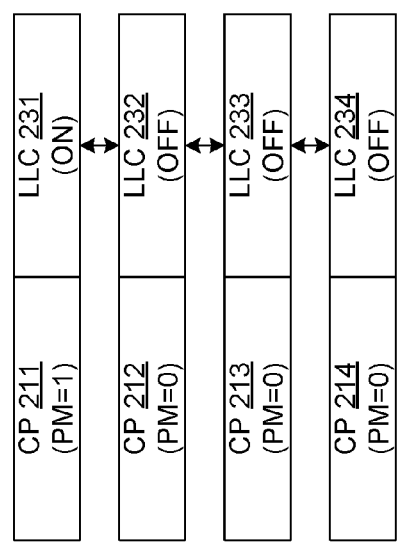

FIGS. 2A-2C illustrate example power states for a homogeneous set of multiple processors and multiple last-level caches. FIGS. 2A-2C illustrates a set of four homogeneous processors 211-214 each most tightly coupled to a corresponding last-level cache 231-234, respectively. In FIG. 2A, all of processors 211-214 are in a higher power mode or active mode (illustrated as power mode—PM=1). Likewise, all of caches 231-234 are in a higher power ('on') mode. Thus, FIG. 2A illustrates a high power state that has all cores 211-214 and all caches 231-234 active. In FIG. 2B, all of processors 211-214 are in a higher power mode (PM=1), but at least cache 232 (and optionally 231) are illustrated as being in a lower power ('off'). Thus, FIG. 2B illustrates an example intermediate power state. In FIG. 2C, only processor 211 is in a higher power or active mode (PM=1) and processors 212-214 are in an inactive or lower power mode (PM=0.) Also in FIG. 2C, only cache 231 (associated with processor 211) is illustrated as being in a higher power ('on') mode. Caches 232-234 are in the lower power ('off') mode. Thus, FIG. 2C illustrates an example low power state.

Figure 3B:
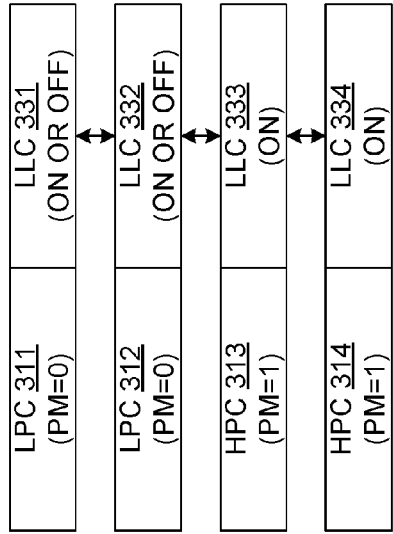
FIGS. 3A-3D illustrate example power states for a heterogeneous set of multiple processors and a corresponding set of multiple last-level caches.
Figure 3D:
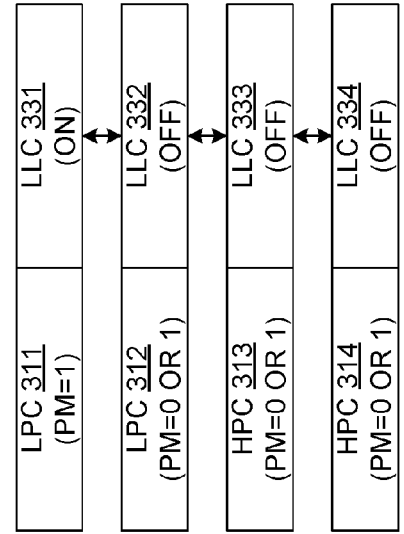
Figure 3A:
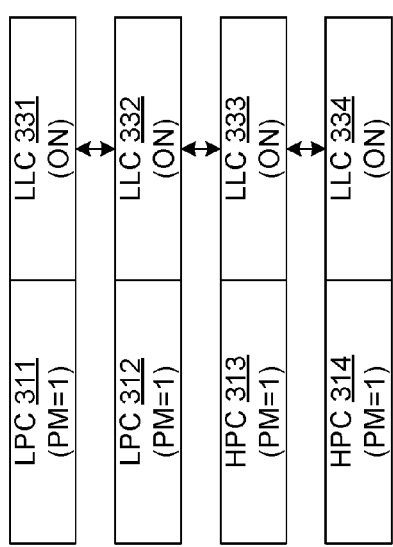

FIGS. 3A-3D illustrate example power states for a heterogeneous set of multiple processors and a corresponding set of multiple last-level caches. FIGS. 3A-3D illustrate a set of four processors 311-314 each most tightly coupled to a corresponding last-level cache 331-334, respectively. However, processors 311 and 312 are illustrated as being low power cores (LPC). Processors 313 and 314 are illustrated as being high power cores (HPC). Typically, low power cores 311-312 will also be lower-performance cores and high power cores 313-314 will be higher-performance cores. In FIG. 3A, all of processors 311-314 are in a higher power mode. Likewise, all of caches 331-334 are in a higher power ('on') mode. Thus, FIG. 3A illustrates a high power state that has lower power cores 311 and 312, higher power cores 313-314, and all caches 331-334 active. In FIG. 3B, low power cores 311 and 312 are illustrated in an inactive or lower power mode (PM=0). High power cores 313 and 314 are illustrated in an active or higher power mode (PM=1), but at least cache 331 and/or cache 332 may be placed in a lower power ('off') mode. Thus, FIG. 3B illustrates some example medium-high power states.

Figure 3C:
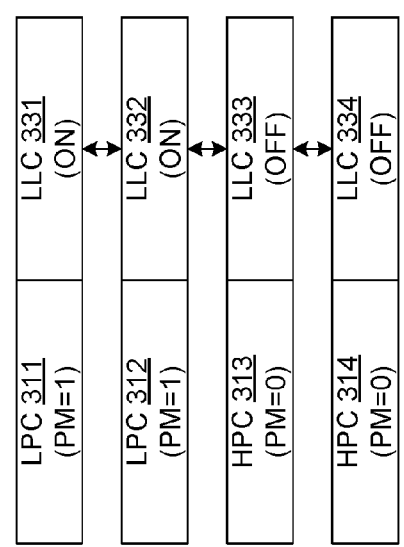

In FIG. 3C, low power cores 311 and 312 are illustrated in an active or higher power mode (PM=1). High power cores 313 and 314 are illustrated in an inactive or lower power mode (PM=0), but cache 333 and cache 334 are illustrated a being in a lower power ('off') mode. Thus, FIG. 3C illustrates an example medium-low power state. In FIG. 3D, only low power core 311 is illustrated in an active or higher power mode (PM=1). Low power core 312 and high power cores 313 and 314 are illustrated as being in either an inactive or lower power mode (PM=0) or optionally in an active or high power mode. However, only cache 331 is in a higher power ('on') mode. Caches 332-334 are illustrated as being in a lower power ('off') mode. Thus, FIG. 3D illustrates some example low power states.

Figure 4:
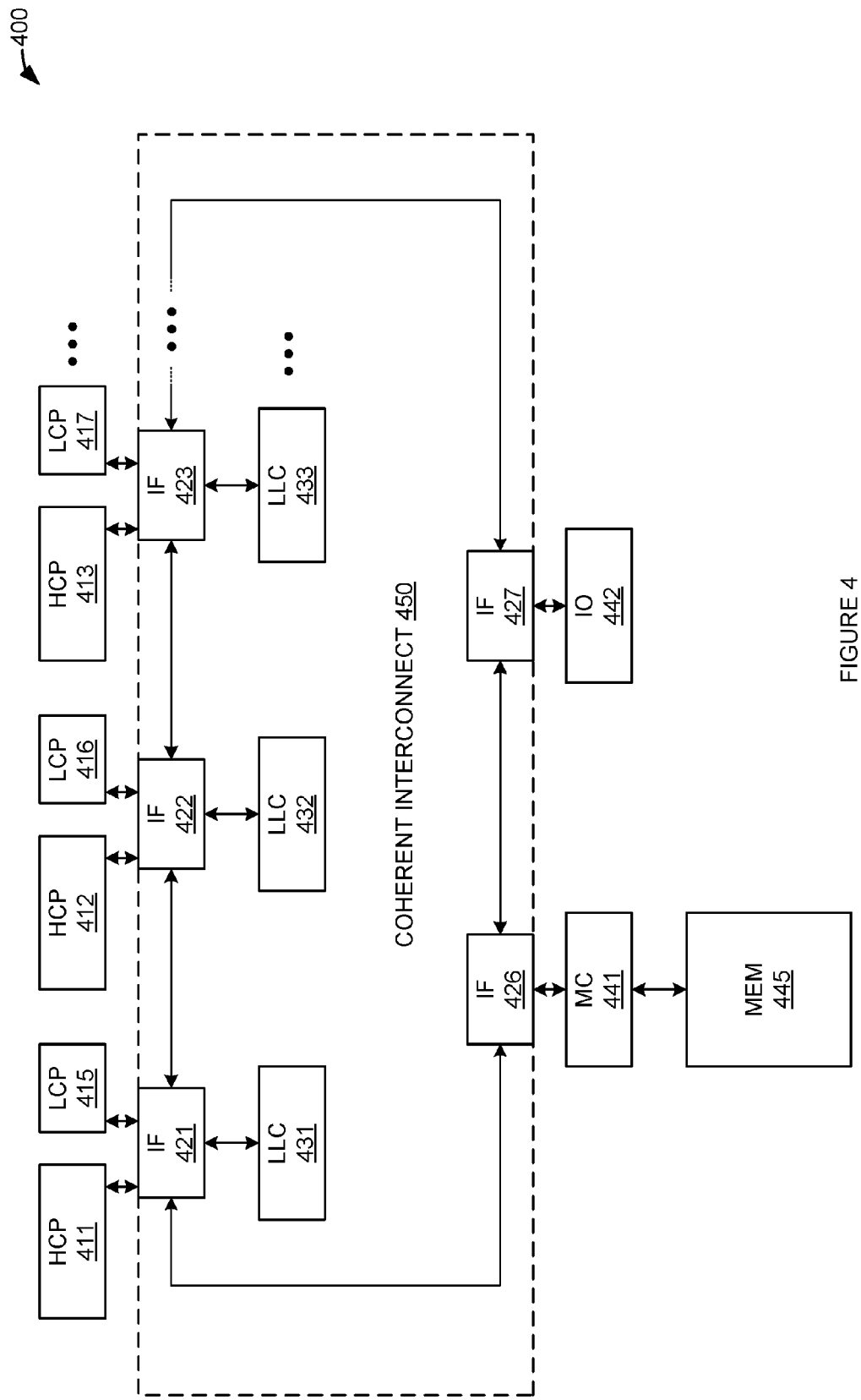
FIG. 4 is a block diagram illustrating a multi-processor system with heterogeneous processors sharing respective last-level caches.

FIG. 4 is a block diagram illustrating a multi-processor system with heterogeneous processors sharing respective last-level caches. In FIG. 4, processing system 100 includes high power core processor (HCP) 411, high power core processor 412, high power core processor 413, low power core processor (LCP) 415, low power core processor 416, low power core processor 417, coherent interconnect 450, memory controller 441, input/output (IO) processor 442, and main memory 445. Coherent interconnect 450 includes interfaces 421-423, interfaces 426-427, and last-level caches 431-433. Processing system 400 may include additional processors, interfaces, caches, and IO processors (not shown in FIG. 4.)

High power core processor 411 and low power core processor 415 are operatively coupled to interface 421 of interconnect 450 which is also coupled to last-level cache 431. Thus, high power core processor 411 and low power core processor 415 are both more tightly coupled to last-level cache 431 than the other caches 432-422. High power core processor 412 and low power core processor 416 are operatively coupled to interface 422 of interconnect 450 which is also coupled to last-level cache 432. Thus, high power core processor 412 and low power core processor 415 are both more tightly coupled to last-level cache 432 than the other caches 431 and 433. High power core processor 413 and low power core processor 417 are operatively coupled to interface 423 of interconnect 450 which is also coupled to last-level cache 433. Thus, high power core processor 413 and low power core processor 417 are both more tightly coupled to last-level cache 433 than the other caches 431-432. Memory controller 441 is operatively coupled to interface 426 of interconnect 450 and to main memory 445. IO processor 442 is operatively coupled to interface 427.

Interface 421 is also operatively coupled to interface 422. Interface 422 is operatively coupled to interface 423. Interface 423 is operatively coupled to interface 427—either directly or via additional interfaces (not shown in FIG. 1.) Interface 427 is operatively coupled to interface 426. Interface 426 is operatively coupled to interface 421. Thus, for the example embodiment illustrated in FIG. 4, it should be understood that interfaces 421-423, 426, and 427 are arranged in a 'ring' interconnect topology. Other network topologies (e.g., mesh, crossbar, star, hybrid(s), etc.) may be employed by interconnect 450.

Interconnect 450 operatively couples high power processors 411-413, low power processors 415-417, memory controller 441, and IO processor 442 to each other and to last-level caches 431-433. Thus, data access operations (e.g., load, stores) and cache operations (e.g., snoops, evictions, flushes, etc.), by a high power processor 411-413, a low power processor 415-417, last-level cache 431-435, memory controller 441, and/or IO processor 442 may be exchanged with each other via interconnect 450 (via interfaces 421-423, 426, and/or 427, in particular.)

In an embodiment, each of high power processors 411-413 and low power processors 415-417 distribute data blocks (i.e., cache lines) to last-level caches 431-433 according to at least two cache hash functions. For example, a first cache hash function may be used to distribute data blocks being used by at least one of high power processors 411-413 and low power processors 415-417 to all of last-level caches 431-433. In another example, one or more (or all) of high power processors 411-413 and low power processors 415-417 may use a second cache hash function to distribute data blocks to less than all of last-level caches 431-433.

Provided all of high power processors 411-413 and low power processors 415-417 (or at least all of high power processors 411-413 and low power processors 415-417 that are actively reading/writing data) are using the same cache hash function at any given time, data read/written by a given high power processor 411-413 and/or low power processor 415-417 will be found in the same last-level cache 431-433 regardless of which high power processor 411-413 or low power processor 415-417 is accessing the data, and regardless of which interface 421-423 the respective processor 411-413 415-417 is connected to.

In other words, the data for a given physical address accessed by any of high power processors 411-413 and low power processors 415-417 will be found cached in the same last-level cache 431-433 regardless of which processor is making the access. The last-level cache 431-433 that holds (or will hold) the data for a given physical address is determined by the current cache hash function being used by high power processors 411-413, low power processors 415-417, memory controller 442, and IO processor 442. The current cache hash function being used by system 400 may be changed from time-to-time. The current cache hash function being used by system 400 may be changed from time-to-time in order to reduce power consumption by turning off (or placing in a lower power mode) one or more of last-level caches 431-433.

FIGS. 5A-5D illustrate example power states for a heterogeneous multi-processor system that share respective last-level caches. FIGS. 5A-5D illustrate example power states for a heterogeneous set of multiple processors and a corresponding set of shared multiple last-level caches. FIGS. 5A-5D illustrate a set of four high power processors 511-514 each most tightly coupled to a corresponding last-level cache 531-534, respectively. A set of four low power processors 515-518 each most tightly coupled to a corresponding last-level cache 531-534, respectively, are also shown. Thus, each of high power processors 511-514 can be viewed as sharing a corresponding last-level cache 531-534 with a respective one of low power processors 515-518.

In FIG. 5A, all of high power cores 511-514 are in a higher power mode (PM=1) mode. All of low power cores are in a higher power (PM=1) mode. All of caches 531-534 are in a higher power ('on') mode. Thus, FIG. 5A illustrates an example high power state that has lower power cores 515-518, higher power cores 511-514, and all caches 531-534 active.

In FIG. 5B, all low power cores 515-517 are illustrated in an inactive or lower power mode (PM=0). High power cores 511-514 are illustrated in an active or higher power mode (PM=1). Caches 531-534 are all illustrated as being in a high power ('on') mode. Thus, FIG. 5B illustrates an example medium-high power state.

In FIG. 5C, all low power cores 515-517 are illustrated in an active or higher power mode (PM=1). High power cores 511-514 are illustrated in an inactive or lower power mode (PM=0). Caches 531-534 are all illustrated as being in a high power ('on') mode. Thus, FIG. 5C illustrates an example medium-low power state.

In FIG. 5D, only low power core 515 is illustrated in an active or higher power mode (PM=1). Low power cores 516-518 are illustrated as being in either a high power or low power mode. High power cores 511-514 are illustrated as being an inactive or lower power mode (PM=0). Only cache 531 is in a higher power ('on') state. Caches 532-534 are illustrated as being in a lower power ('off') mode. Thus, FIG. 5D illustrates some example low power states.

Figure 6A:
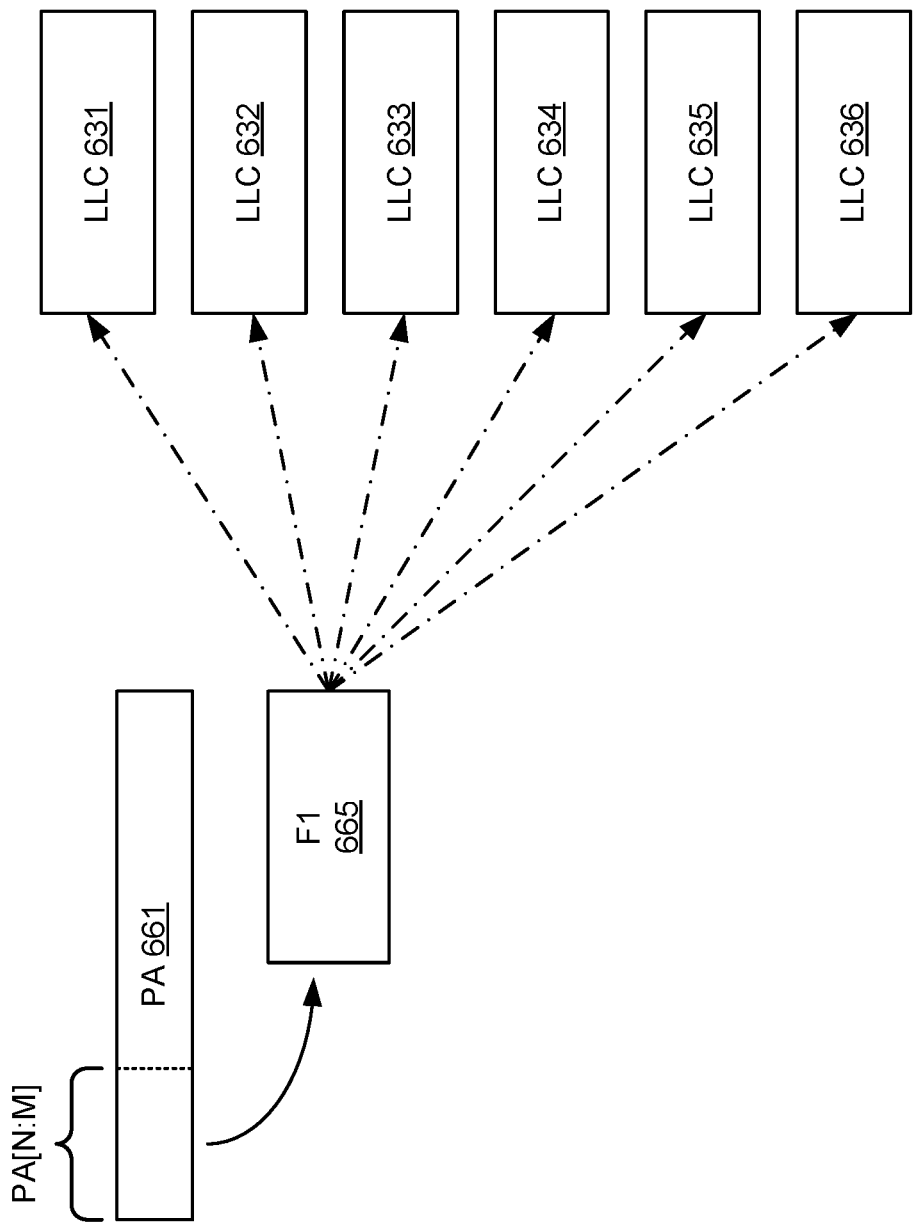
FIG. 6A illustrates a first cache hashing function that distributes accesses to all of a set of last-level caches.

FIG. 6A illustrates a first cache hashing function that distributes accesses to all of a set of last-level caches. In FIG. 6A, a field of bits (e.g., PA[N:M] where N and M are integers) of a physical address PA 661 is input to a first cache hashing function 665. Cache hashing function 665 processes the bits of PA[N:M] in order to select one of a set of last-level caches 631-636. This selected last-level cache 631-636 is to be the cache that will (or does) hold data corresponding physical address 661 as a result of cache function F1 665 being used (e.g., by processors 111-115, processors 211-214, processors 311-314, processors 411-413, processors 415-417, processors 511-514, and/or processors 515-518.)

Figure 6B:
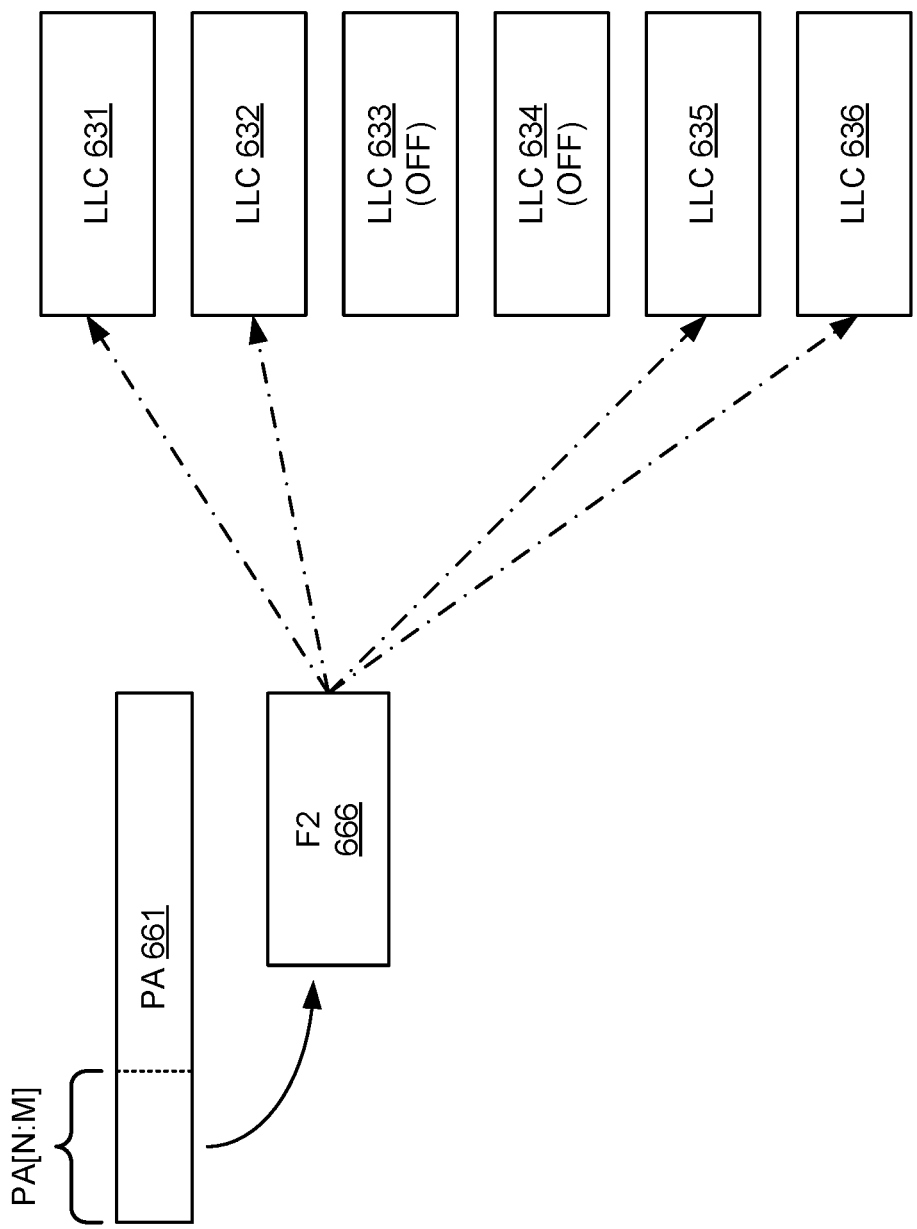
FIG. 6B illustrates a second cache hashing function that distributes accesses to a subset of the last-level caches.

FIG. 6B illustrates a second cache hashing function that distributes accesses to a subset of the last-level caches. In FIG. 6B, a field of bits (e.g., PA[N:M] where N and M are integers) of the same physical address PA 661 is input to a second cache hashing function 666. Cache hashing function 666 processes the bits of PA[N:M] in order to select one of a set of last-level caches consisting of 631, 632, 635, and 636. This selected last-level cache is to be the cache that will (or does) hold data corresponding physical address 661 as a result of cache function F2 666 being used (e.g., by processors 111-115, processors 211-214, processors 311-314, processors 411-413, processors 415-417, processors 511-514, and/or processors 515-518.) Thus, while cache hashing function 666 is being used, last-level caches 633 and 634 may be turned off or placed in some other power-saving mode.

Figure 7:
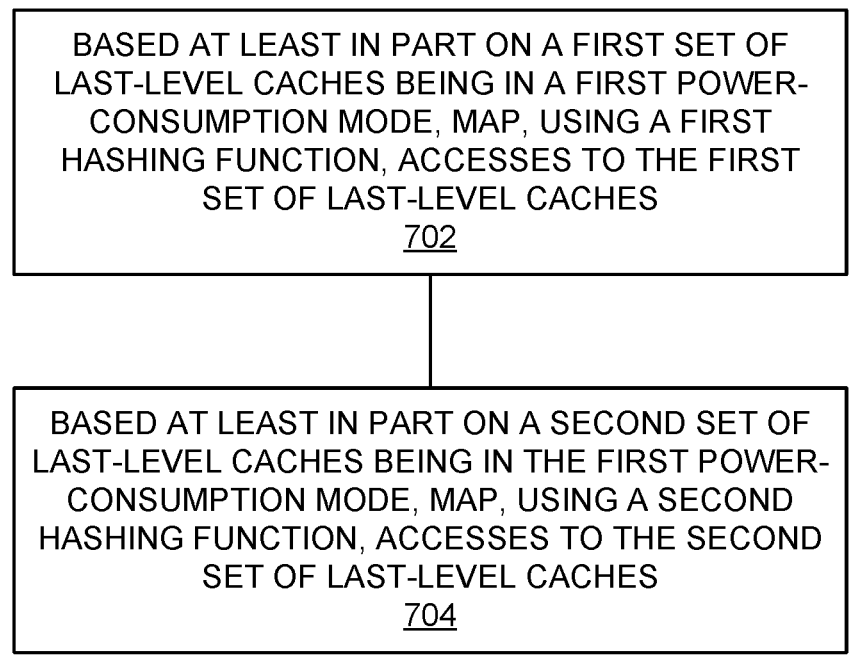
FIG. 7 is a flowchart illustrating a method of operating a processing system having a plurality of processor cores.

FIG. 7 is a flowchart illustrating a method of operating a processing system having a plurality of processor cores. The steps illustrated in FIG. 7 may be performed, for example, by one or more elements of processing system 100, processing system 400, and/or their components. Based at least in part on a first set of last-level caches being in a first power-consumption mode, accesses to the first set of last-level caches are mapped using a first hashing function (702). For example, when last-level caches 131-135 are all 'on', processor 111 may map its accesses using a first hashing function that distributes these accesses to any and all of last-level caches 131-135.

Based at least in part on a second set of last-level caches being in the first power-consumption mode, accesses to the second set of last-level caches are mapped using a second hashing function (704). For example, based at least in part on one or more of last-level caches 131-135 being 'off', processor 111 may map its accesses using a second hashing function that distributes these accesses only to those of last-level caches 131-135 that are 'on'. In other words, when one or more of last-level caches 131-135 are 'off', processor 111 uses the second hashing function to avoid accessing those of last-level caches 131-135 that are 'off'.

Figure 8:
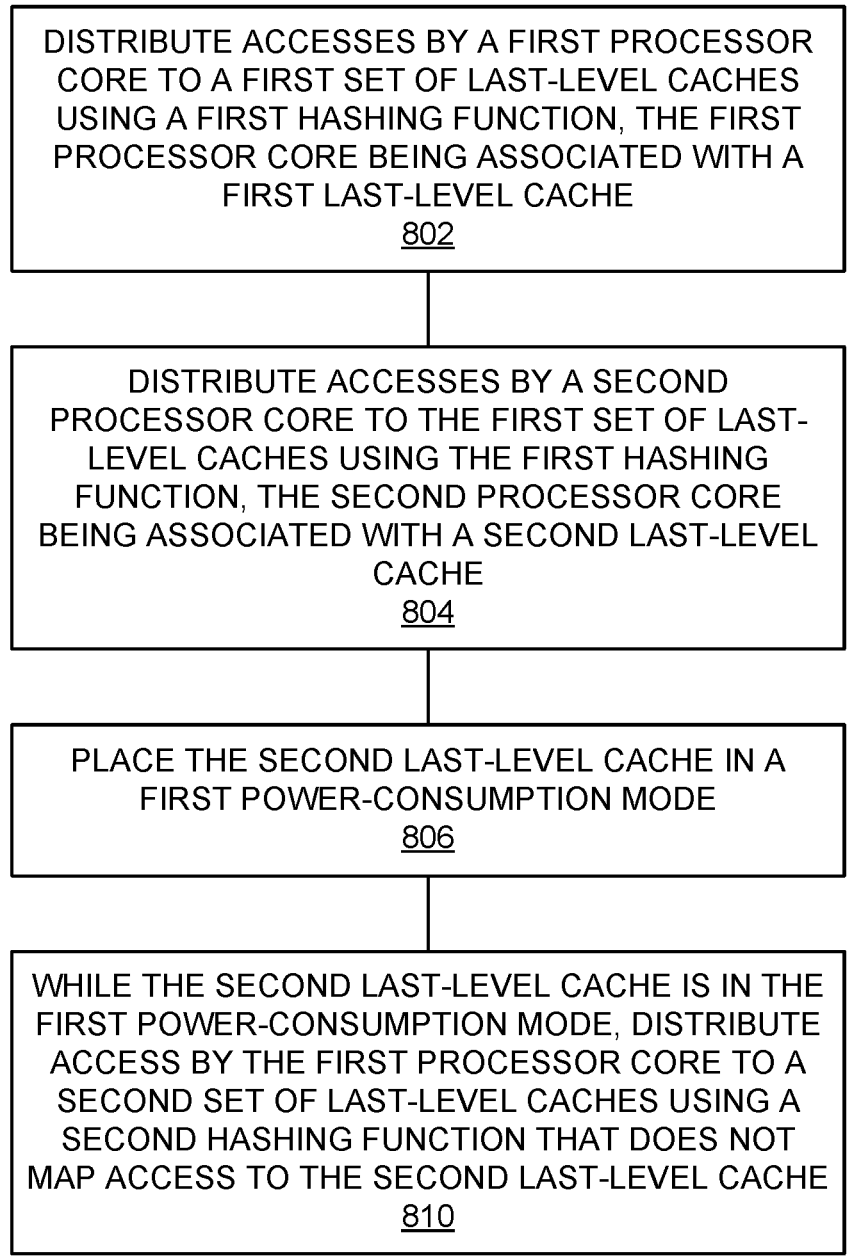
FIG. 8 is a flowchart illustrating method of changing the distribution of accesses among sets of last-level caches.

FIG. 8 is a flowchart illustrating method of changing the distribution of accesses among sets of last-level caches. The steps illustrated in FIG. 8 may be performed by one or more elements of processing system 100, processing system 400, and/or their components. Accesses by a first processor core to a first set of last-level caches are distributed using a first hashing function where the first processor core is associated with a first last-level cache (802). For example, processor 111 (which is associated with LLC 131) may distribute accesses according to a first hash function that results in these accesses being distributed to any and all of last-level caches 131-135.

Accesses by a second processor core to the first set of last-level caches are distributed using the first hashing function where the second processor core is associated with a second last-level cache (804). For example, processor 112 (which is associated with LLC 132) may distribute accesses according to a first hash function that results in these accesses being distributed to any and all of last-level caches 131-135.

The second last-level cache is placed in a first power-consumption mode (806). For example, last-level cache 132 may be placed in low power, inactive, and/or 'off' mode. While the second last-level cache is in the first power-consumption mode, accesses by the first processor core are distributed to a second set of last-level caches using a second hashing function that does not map accesses to the second last-level cache (810). For example, while last-level cache 132 is placed in low power, inactive, and/or 'off' mode, processor 111 may use a second hash function to distribute accesses among caches 131, and 133-135 (but not cache 132).

The methods, systems and devices described herein may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of processing system 100, and/or processing system 400, and their components. These software descriptions may be: behavioral, register transfer, logic component, transistor, and layout geometry-level descriptions.

Data formats in which such descriptions may be implemented are stored on a non-transitory computer readable medium include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Physical files may be implemented on non-transitory machine-readable media such as: 4 mm magnetic tape, 8 mm magnetic tape, 3-½-inch floppy media, CDs, DVDs, hard disk drives, solid-state disk drives, solid-state memory, flash drives, and so on.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), multi-core processors, graphics processing units (GPUs), etc.

Figure 9:
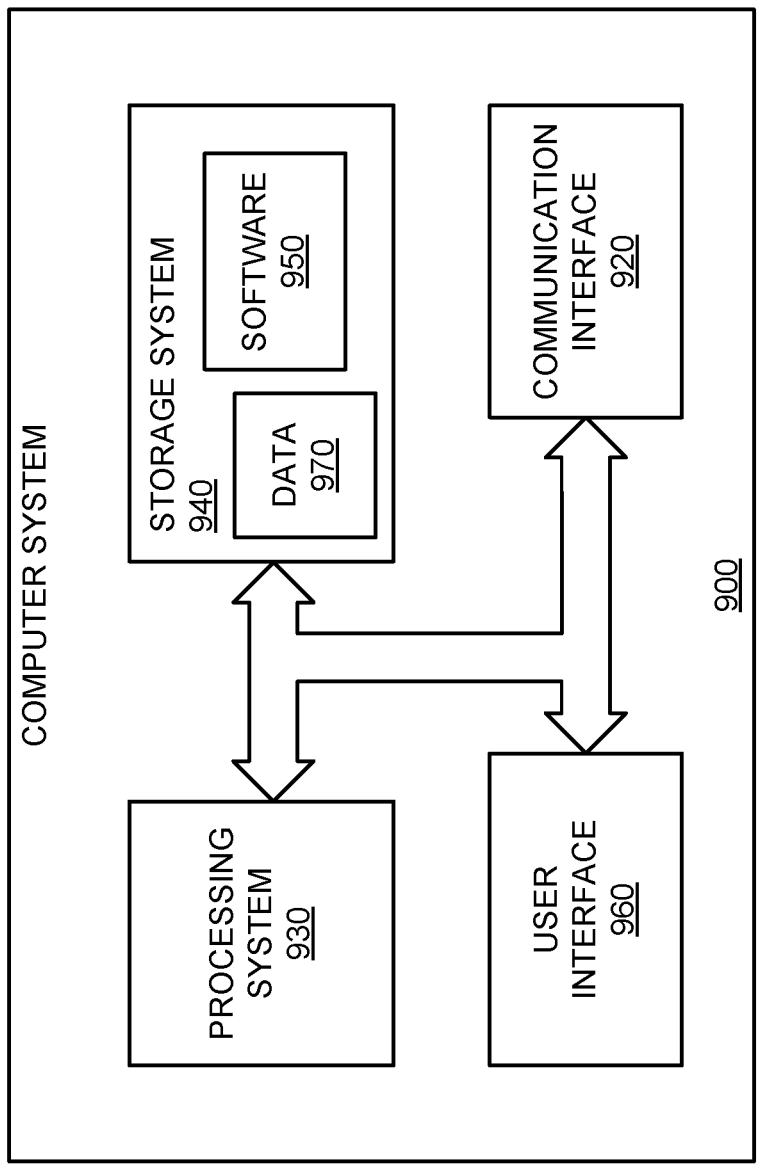
FIG. 9 is a block diagram of a computer system.

FIG. 9 illustrates a block diagram of an example computer system. In an embodiment, computer system 900 and/or its components include circuits, software, and/or data that implement, or are used to implement, the methods, systems and/or devices illustrated in the Figures, the corresponding discussions of the Figures, and/or are otherwise taught herein.

Computer system 900 includes communication interface 920, processing system 930, storage system 940, and user interface 960. Processing system 930 is operatively coupled to storage system 940. Storage system 940 stores software 950 and data 970. Processing system 930 is operatively coupled to communication interface 920 and user interface 960. Processing system 930 may be an example of one or more of processing system 100, processing system 400, and/or their components.

Computer system 900 may comprise a programmed general-purpose computer. Computer system 900 may include a microprocessor. Computer system 900 may comprise programmable or special purpose circuitry. Computer system 900 may be distributed among multiple devices, processors, storage, and/or interfaces that together comprise elements 920-970.

Communication interface 920 may comprise a network interface, modem, port, bus, link, transceiver, or other communication device. Communication interface 920 may be distributed among multiple communication devices. Processing system 930 may comprise a microprocessor, microcontroller, logic circuit, or other processing device. Processing system 930 may be distributed among multiple processing devices. User interface 960 may comprise a keyboard, mouse, voice recognition interface, microphone and speakers, graphical display, touch screen, or other type of user interface device. User interface 960 may be distributed among multiple interface devices. Storage system 940 may comprise a disk, tape, integrated circuit, RAM, ROM, EEPROM, flash memory, network storage, server, or other memory function. Storage system 940 may include computer readable medium. Storage system 940 may be distributed among multiple memory devices.

Processing system 930 retrieves and executes software 950 from storage system 940. Processing system 930 may retrieve and store data 970. Processing system 930 may also retrieve and store data via communication interface 920. Processing system 950 may create or modify software 950 or data 970 to achieve a tangible result. Processing system may control communication interface 920 or user interface 960 to achieve a tangible result. Processing system 930 may retrieve and execute remotely stored software via communication interface 920.

Software 950 and remotely stored software may comprise an operating system, utilities, drivers, networking software, and other software typically executed by a computer system. Software 950 may comprise an application program, applet, firmware, or other form of machine-readable processing instructions typically executed by a computer system. When executed by processing system 930, software 950 or remotely stored software may direct computer system 900 to operate as described herein.

Implementations discussed herein include, but are not limited to, the following examples:

EXAMPLE 1

An integrated circuit, comprising: a plurality of last-level caches that can be placed in at least a first high power consumption mode and a first low power consumption mode; a plurality of processor cores to access data in the plurality of last-level caches according to a first hashing function that maps processor access addresses to respective ones of the plurality of last-level caches based at least in part on all of the last-level caches being in the first high power consumption mode, the plurality of processor cores to access data in the plurality of last-level caches according to a second hashing function that maps processor access addresses to a subset of the plurality of last-level caches based at least in part on at least one of the last-level caches being in the first low power consumption mode; and, an interconnect network to receive hashed access addresses from the plurality of processor cores and to couple each of the plurality of processor cores to a respective one of the plurality of last-level caches specified by the hashed access addresses generated by a respective one of the first and second hashing function.

EXAMPLE 2

The integrated circuit of example 1, wherein the plurality of processor cores includes a low power type processor core and a high power type processor core.

EXAMPLE 3

The integrated circuit of example 2, wherein the low power type processor core is associated with a first one of the last-level caches and the high power type processor core is also associated with the first one of the last-level caches.

EXAMPLE 4

The integrated circuit of example 2, wherein the low power type processor core is associated with a first one of the last-level caches and the high power type processor core is associated with a second one of the last-level caches.

EXAMPLE 5

The integrated circuit of example 1, wherein each of the plurality of processor cores is associated with a respective one of the last-level caches.

EXAMPLE 6

The integrated circuit of example 4, wherein based at least in part on the subset of the plurality of last-level caches being in the first low power consumption mode, the respective ones of the plurality of processor cores most tightly coupled to the respective ones of the subset of the plurality of last-level caches are placed in a second low power consumption mode.

EXAMPLE 7

The integrated circuit of example 6, wherein the subset of the plurality of last-level caches corresponds to the ones of the plurality of last-level caches associated with respective ones of the plurality of processor cores that are in the second low power consumption mode.

EXAMPLE 8

A method of operating a processing system having a plurality of processor cores, comprising: based at least in part on a first set of last-level caches of a plurality of last-level caches being in a first power-consumption mode, mapping, using a first hashing function, accesses by a first processor core of the plurality of processor cores to the first set of last-level caches; and, based at least in part on a second set of last-level caches of the plurality of last-level caches being in the first power-consumption mode, mapping, using a second hashing function, accesses by the first processor core to the second set of last-level caches.

EXAMPLE 9

The method of example 8, wherein the first processor core is more tightly coupled to a first one of the plurality of last-level caches than to other last-level caches of the plurality of last-level caches.

EXAMPLE 10

The method of example 9, wherein the first one of the plurality of last-level caches is in both the first set of last-level caches and the second set of last-level caches.

EXAMPLE 11

The method of example 8, wherein the first processor core is more tightly coupled to a first one of the plurality of last-level caches than to other last-level caches of the plurality of last-level caches and a second processor core is more tightly coupled to a second one of the plurality of last-level caches than to other last-level caches of the plurality of last-level caches.

EXAMPLE 12

The method of example 11, wherein the second last-level cache is in the first set of last-level caches and is not in the second set of last-level caches.

EXAMPLE 13

The method of example 12, wherein when the first set of last-level caches of the plurality of last-level caches are in the first power-consumption mode, the second processor core is in a second power-consumption mode, and when the second set of last-level caches of the plurality of last-level caches are in the first power-consumption mode, the second processor core is in a third power-consumption mode.

EXAMPLE 14

The method of example 13, wherein the first processor core is a low power type processor core and the second processor core is a high-performance type processor core.

EXAMPLE 15

A method of operating a plurality of processor cores on an integrated circuit, comprising: distributing accesses by a first processor core to a first set of last-level caches of a plurality of last-level caches using a first hashing function, the first processor core associated with a first last-level cache of the plurality of last-level caches; distributing accesses by a second processor core to the first set of last-level caches using the first hashing function, the second processor core associated with a second last-level cache of the plurality of last-level caches; placing the second last-level cache in a first power-consumption mode; and, while the second last-level cache is in the first power-consumption mode, distributing accesses by the first processor core to a second set of last-level caches using a second hashing function that does not map accesses to the second last-level cache.

EXAMPLE 16

The method of example 15, wherein the first processor core is a low-performance low power consumption type processor core and the second processor core is a high-performance high power-consumption type processor core.

EXAMPLE 17

The method of example 15, further comprising: distributing accesses by a third processor core to the first set of last-level caches using the first hashing function, the third processor core associated with a third last-level cache of the plurality of last-level caches; placing the third last-level cache in the first power-consumption mode; while the third last-level cache is in the first power-consumption mode, distributing accesses by the first processor core to a third set of last-level caches using a third hashing function that does not map accesses to either of the second last-level cache and the third last-level cache.

EXAMPLE 18

The method of example 17, wherein the first processor core is a low-performance low power consumption type processor core, the second processor core is the low-performance low power-consumption type processor core, and the third processor core is a high-performance high power consumption type core.

EXAMPLE 19

The method of example 15, wherein based at least in part on the second last-level cache being in the first power-consumption mode, the second processor core is placed in a second power consumption mode.

EXAMPLE 20

The method of example 19, wherein based at least in part on the second processing core being in the second power consumption mode, the second processor core does not perform accesses to memory locations that can be stored in the plurality of last-level caches.

The foregoing description of the example embodiments have been presented for purposes of illustration and description. It is not intended to be exhaustive or to limit what is claimed to the precise form disclosed, and other modifications and variations may be possible in light of the above teachings. The embodiments were chosen and described in order to explain the principles herein and their practical application thereby enabling others skilled in the art to utilize the various embodiments and various modifications thereof as are suited to the particular use contemplated. It is intended that the appended claims be construed to include other alternative embodiments except insofar as limited by the prior art.

What is claimed is:

1. An integrated circuit, comprising:
    a plurality of last-level caches that can be placed in at least a first high power consumption mode and a first low power consumption mode;
    a plurality of processor cores to access data in the plurality of last-level caches according to a first hashing function that maps processor access addresses to respective ones of the plurality of last-level caches based at least in part on all of the last-level caches being in the first high power consumption mode, the plurality of processor cores to access data in the plurality of last-level caches according to a second hashing function that maps processor access addresses to a subset of the plurality of last-level caches based at least in part on at least one of the last-level caches being in the first low power consumption mode; and,
    an interconnect network to receive hashed access addresses from the plurality of processor cores and to couple each of the plurality of processor cores to a respective one of the plurality of last-level caches specified by the hashed access addresses generated by a respective one of the first and second hashing function.

2. The integrated circuit of claim 1, wherein the plurality of processor cores includes a low power type processor core and a high power type processor core.

3. The integrated circuit of claim 2, wherein the low power type processor core is associated with a first one of the last-level caches and the high power type processor core is also associated with the first one of the last-level caches.

4. The integrated circuit of claim 2, wherein the low power type processor core is associated with a first one of the last-level caches and the high power type processor core is associated with a second one of the last-level caches.

5. The integrated circuit of claim 1, wherein each of the plurality of processor cores is associated with a respective one of the last-level caches.

6. The integrated circuit of claim 4, wherein based at least in part on the subset of the plurality of last-level caches being in the first low power consumption mode, the respective ones of the plurality of processor cores most tightly coupled to the respective ones of the subset of the plurality of last-level caches are placed in a second low power consumption mode.

7. The integrated circuit of claim 6, wherein the subset of the plurality of last-level caches corresponds to the ones of the plurality of last-level caches associated with respective ones of the plurality of processor cores that are in the second low power consumption mode.

8. A method of operating a processing system having a plurality of processor cores, comprising:
    based at least in part on a first set of last-level caches of a plurality of last-level caches being in a first power-consumption mode, mapping, using a first hashing function, accesses by a first processor core of the plurality of processor cores to the first set of last-level caches; and,
    based at least in part on a second set of last-level caches of the plurality of last-level caches being in the first power-consumption mode, mapping, using a second hashing function, accesses by the first processor core to the second set of last-level caches.

9. The method of claim 8, wherein the first processor core is more tightly coupled to a first one of the plurality of last-level caches than to other last-level caches of the plurality of last-level caches.

10. The method of claim 9, wherein the first one of the plurality of last-level caches is in both the first set of last-level caches and the second set of last-level caches.

11. The method of claim 8, wherein the first processor core is more tightly coupled to a first one of the plurality of last-level caches than to other last-level caches of the plurality of last-level caches and a second processor core is more tightly coupled to a second one of the plurality of last-level caches than to other last-level caches of the plurality of last-level caches.

12. The method of claim 11, wherein the second last-level cache is in the first set of last-level caches and is not in the second set of last-level caches.

13. The method of claim 12, wherein when the first set of last-level caches of the plurality of last-level caches are in the first power-consumption mode, the second processor core is in a second power-consumption mode, and when the second set of last-level caches of the plurality of last-level caches are in the first power-consumption mode, the second processor core is in a third power-consumption mode.

14. The method of claim 13, wherein the first processor core is a low power type processor core and the second processor core is a high-performance type processor core.

15. A method of operating a plurality of processor cores on an integrated circuit, comprising:
distributing accesses by a first processor core to a first set of last-level caches of a plurality of last-level caches using a first hashing function, the first processor core associated with a first last-level cache of the plurality of last-level caches;
distributing accesses by a second processor core to the first set of last-level caches using the first hashing function, the second processor core associated with a second last-level cache of the plurality of last-level caches;
placing the second last-level cache in a first power-consumption mode; and,
while the second last-level cache is in the first power-consumption mode, distributing accesses by the first processor core to a second set of last-level caches using a second hashing function that does not map accesses to the second last-level cache.

16. The method of claim 15, wherein the first processor core is a low-performance low power consumption type processor core and the second processor core is a high-performance high power-consumption type processor core.

17. The method of claim 15, further comprising:
distributing accesses by a third processor core to the first set of last-level caches using the first hashing function, the third processor core associated with a third last-level cache of the plurality of last-level caches;
placing the third last-level cache in the first power-consumption mode; and,
while the third last-level cache is in the first power-consumption mode, distributing accesses by the first processor core to a third set of last-level caches using a third hashing function that does not map accesses to either of the second last-level cache and the third last-level cache.

18. The method of claim 17, wherein the first processor core is a low-performance low power consumption type processor core, the second processor core is the low-performance low power-consumption type processor core, and the third processor core is a high-performance high power consumption type core.

19. The method of claim 15, wherein based at least in part on the second last-level cache being in the first power-consumption mode, the second processor core is placed in a second power consumption mode.

20. The method of claim 19, wherein based at least in part on the second processing core being in the second power consumption mode, the second processor core does not perform accesses to memory locations that can be stored in the plurality of last-level caches.

* * * * *